United States Patent
Hatakeyama

(10) Patent No.: US 8,145,902 B2
(45) Date of Patent: Mar. 27, 2012

(54) METHODS AND APPARATUS FOR SECURE PROCESSOR COLLABORATION IN A MULTI-PROCESSOR SYSTEM

(75) Inventor: Akiyuki Hatakeyama, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1085 days.

(21) Appl. No.: 11/346,946

(22) Filed: Feb. 3, 2006

(65) Prior Publication Data

US 2006/0179487 A1 Aug. 10, 2006

Related U.S. Application Data

(60) Provisional application No. 60/650,754, filed on Feb. 7, 2005.

(51) Int. Cl.
*G06F 21/00* (2006.01)
(52) U.S. Cl. ........................ 713/164; 713/161
(58) Field of Classification Search .................. 711/153; 713/164
See application file for complete search history.

(56) References Cited

U.S. PATENT DOCUMENTS

| | | | |
|---|---|---|---|
| 4,837,682 | A | 6/1989 | Culler |
| 6,526,491 | B2 | 2/2003 | Suzuoki et al. |
| 6,826,662 | B2 | 11/2004 | Suzuoki et al. |
| 7,475,257 | B2 * | 1/2009 | Aguilar et al. ............... 713/189 |
| 2002/0138707 | A1 | 9/2002 | Suzuoki et al. |
| 2005/0132217 | A1 * | 6/2005 | Srinivasan et al. ............ 713/200 |
| 2005/0268106 | A1 * | 12/2005 | Mansell et al. ............... 713/182 |
| 2005/0289334 | A1 | 12/2005 | Yamana et al. |
| 2006/0090084 | A1 * | 4/2006 | Buer ............................ 713/189 |

FOREIGN PATENT DOCUMENTS

| | | |
|---|---|---|
| JP | 2002351850 A1 | 12/2002 |
| WO | WO 01/99030 A2 | 12/2001 |
| WO | 2004099981 A1 | 11/2004 |

OTHER PUBLICATIONS

ISR and Written Opinion, May 29, 2006.
Office Action for corresponding Japanese Patent Application 2006-024772, dated Jul. 14, 2009.
Office Action for corresponding Japanese application JP2006-024772, dated Jun. 1, 2010.

* cited by examiner

*Primary Examiner* — Vivek Srivastava
*Assistant Examiner* — Anthony Brown
(74) *Attorney, Agent, or Firm* — Matthew B. Dernier, Esq.; Gibson & Dernier LLP

(57) ABSTRACT

In a multi-processor system including a plurality of processors capable of being operatively coupled to the main memory and each processor including an associated local memory, and at least one main processor operable to control access by the processors to data within the main memory and within the processors, methods and apparatus provide for: entering a secure mode of operation within at least one of the processors in which no requests initiated by others of the processors for data transfers into or out of the at least one processor are serviced, but such transfers initiated by the at least one processor are serviced subject to the access controlled by the main processing unit; and using the main processing unit to exclude access to data associated with at least one further processor by others of the processors except for the at least one processor.

14 Claims, 3 Drawing Sheets

FIG. 3

200 USE AT LEAST ONE PROCESSOR TO ENTER A SECURE MODE OF OPERATION

202 USE THE MAIN PROCESSOR TO EXCLUDE ACCESS TO DATA OF AT LEAST ONE FURTHER PROCESSOR

204 ESTABLISH A SECURE SESSION BETWEEN THE SECURE PROCESSOR AND THE FURTHER PROCESSOR

206 PERMIT ACCESS TO DATA CONTAINED IN THE FURTHER PROCESSOR BY THE MAIN PROCESSOR

208 PERMIT ACCESS TO DATA CONTAINED IN THE SECURE PROCESSOR BY THE FURTHER PROCESSOR

METHODS AND APPARATUS FOR SECURE PROCESSOR COLLABORATION IN A MULTI-PROCESSOR SYSTEM

CROSS REFERENCE TO RELATED APPLICATION

This application claims the benefit of U.S. Provisional Patent Application No. 60/650,754, filed Feb. 7, 2005, entitled "Methods And Apparatus For Secure Processor Collaboration In A Multi-Processor System," the entire disclosure of which is hereby incorporated by reference.

JOINT DEVELOPMENT AGREEMENT

The claimed subject matter of this application was developed under a joint development agreement among Sony Computer Entertainment Inc. and International Business Machines Corporation.

BACKGROUND OF THE INVENTION

The present invention relates to methods and apparatus for facilitating secure collaboration between one or more processors in a multi-processing system.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results. Real-time, multimedia applications also place a high demand on processing systems; indeed, they require extremely fast processing speeds, such as many thousands of megabits of data per second.

While some processing systems employ a single processor to achieve fast processing speeds, others are implemented utilizing multi-processor architectures. In multi-processor systems, a plurality of sub-processors can operate in parallel (or at least in concert) to achieve desired processing results. It has also been contemplated to employ a modular structure in a multi-processing system, where the computing modules are accessible over a broadband network (such as the Internet) and the computing modules may be shared among many users. Details regarding this modular structure may be found in U.S. Pat. No. 6,526,491, the entire disclosure of which is hereby incorporated by reference.

A problem arises, however, when a processing system is used over a network or is part of a shared resource. In particular, the processor and its associated hardware, software, data and the like are subject to outside influences such as intentional hacking, viruses and the like. Another problem involves the unauthorized or outright malicious effects that may be introduced by boot software, operating system software, application software, and content (data) that is not authenticated in some way prior to execution. Unfortunately, the conventional process of executing software applications (or other types of digital content) prescribes reading the software from a memory and executing same using a processor. Even if the processing system in which the software is executed employs some type of security feature, the software might be tampered with or may not be authorized for execution in the first place. Thus, any later invoked security measures cannot be fully trusted and may be usurped.

In the multi-processor context, it has been contemplated to have a "secure" processor in the system enter a mode in which no requests initiated by others of the processors for data transfers into or out of the secure processor are serviced, but such transfers initiated by the secure processor are serviced. In this way, the processing environment within the secure processor may be trusted to carry out sensitive operations. While this security approach works well when the processors in the multi-processing system are completely autonomous, problems may arise when one or more of the processors in the system seek to perform oversight or monitoring processes in which data within the secure processor is requested.

For example, in a multi-processing system it may be desirable for one of the processors (e.g., a main processor) to monitor the application program(s) and data being executed on the other processors (sub-processors) in order for the main processor to invoke processing changes. For example, the main processor may want to move tasks from one sub-processor to another sub-processor, to allocate data among the sub-processors, to pause execution of tasks within a sub-processor, etc. This may involve the main processor seeking to obtain data within any local memories, hardware registers, and other components of the sub-processors. If a particular processor is in a secure mode, however, the main processor might not be permitted access to the data and, therefore, as an undesirable consequence the efficacy of the management function of the main processor may be reduced.

Accordingly, there are needs in the art for new methods and apparatus for providing security features in a multi-processing system that permit secure collaborative relationships among the processors.

SUMMARY OF THE INVENTION

Aspects of the invention provide for a main processor to control the memory space of the system in such a way as to establish a collaborative, semi-isolated relationship between a secure processor and an un-secure processor.

In this regard, it is desirable to establish a secure processing environment within at least one of the processors of the system. This may involve triggering a state in which no externally-initiated data access request into the secure processor will be responded to. In other words, the secure processor will not respond to any outside request for data (e.g., a request to read contents on a local memory or registers). Thus, when the processor enters a secure mode, it creates a trusted environment.

It is noted that this process may also involve invoking a secure boot process in which the boot code of the secure processor (and possibly the other processors of the system) is authenticated before it is used to boot the processor. Still further, entering the secure mode of operation may also involve authenticating operating system software, application programs, and content. It is noted that as used herein, the terms "content" and "data" are broadly construed to include any type of program code, application software, system level software, any type of data, a data stream, etc.

As mentioned above, the main processor is operable to control the memory space of the system in such a way as to establish a secure collaborative relationship between the secure processor and one or more further processors that are not necessarily in a secure mode of operation. For example, the main processor may control the address to which and from which data may be transferred as concerns the initiation of such transfer by a particular processor. This may apply to a shared memory of the multi-processing system where each processor has a defined area (sandbox) of the shared memory in which to work. Generally, while each processor may limit its use of the shared memory, others of the processors may at least copy the data from any sandbox. The main processor, however, may control which sandboxes are accessible to which processors. Further details of how the main processor may control the memory space of the system are disclosed in U.S. Pat. No. 6,526,491.

Through coordination by the main processor of the use of a secure processor and an un-secure processor, a collaborative relationship may be achieved. For example, the main processor may permit a second processor (an un-secure processor) to access the memory space associated with a first processor (a secure processor), but the main processor may proscribe any other processor from accessing the memory space associated with the second processor. In this way, the second processor has an isolated relationship with the first processor. The secure processor may share sensitive and non-sensitive data with the un-secure processor without concern that the other processors of the system will access such data; indeed, they may not access the memory space associated with second processor.

With this collaboration, the main processor (e.g., through its operating system) would have access to the data of the second processor, which may include data of the first processor. This may permit the main processor to move tasks, allocate data, pause task execution, etc. Further embodiments may permit two or more processors to each have an isolated relationship with the secure processor so that sensitive data may be shared therebetween.

In accordance with one or more embodiments of the present invention, an apparatus includes: a plurality of processors capable of being operatively coupled to a main memory, each processor including an associated local memory and being operable to request at least some data from the main memory for use in the local memory; and at least one main processor operable to control access by the processors to data within the main memory and within the processors. At least one of the processors is preferably operable to enter a secure mode of operation in which no requests initiated by others of the processors for data transfers into or out of the at least one processor are serviced, but such transfers initiated by the at least one processor are serviced subject to the access controlled by the main processing unit. The main processing unit is preferably operable to exclude access to data associated with at least one further processor by others of the processors except for the at least one processor.

In accordance with one or more further embodiments of the present invention, an apparatus includes: a plurality of processors capable of being operatively coupled to a main memory that includes a plurality of sandboxes;, each processor including an associated local memory, being operable to request at least some data from the main memory for use in the local memory, and being associated with one or more of the sandboxes; and at least one main processor operable to at least one of permit or deny access by the processors to data within the respective sandboxes, and control access by the processors to data within the processors. At least one of the processors is preferably operable to enter a secure mode of operation in which no requests initiated by others of the processors for data transfers into or out of the at least one processor are serviced, but such transfers initiated by the at least one processor are serviced subject to the access controlled by the main processing unit. The main processing unit is preferably operable to at least one of deny access to the at least one sandbox of the at least one further processor by the other processors except the at least one processor.

In accordance with one or more further embodiments of the present invention, a method includes: entering a secure mode of operation within at least one of the processors in which no requests initiated by others of the processors for data transfers into or out of the at least one processor are serviced, but such transfers initiated by the at least one processor are serviced subject to the access controlled by the main processing unit; and using the main processing unit to exclude access to data associated with at least one further processor by others of the processors except for the at least one processor. The method may also include permitting access to data within the shared memory associated with the at least one processor by the at least one further processor.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 3 is a flow diagram illustrating process steps that may be carried out by the processing system of FIG. 1 in accordance with one or more further aspects of the present invention.

DETAILED DESCRIPTION OF THE PRESENT INVENTION

Figure 1:
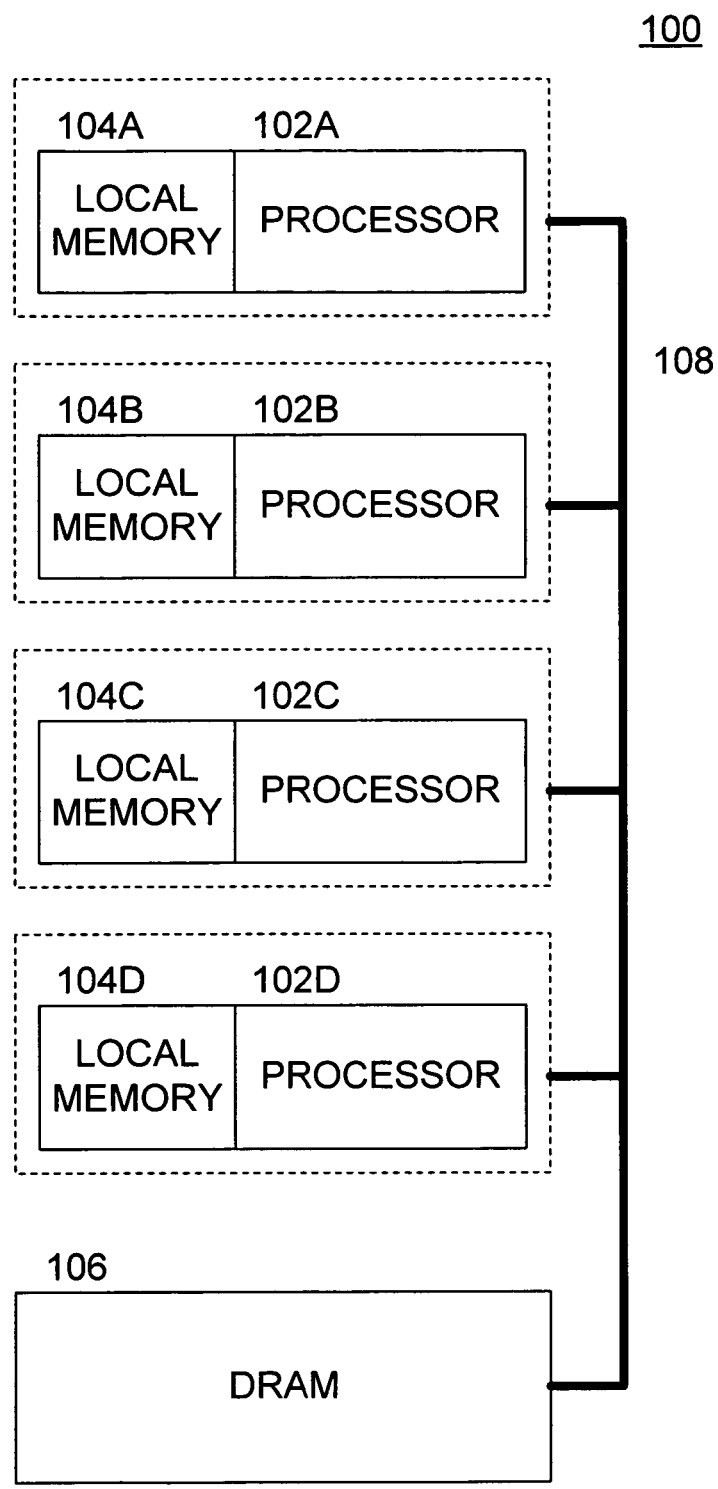
FIG. 1 is a block diagram illustrating the structure of a multi-processing system having two or more sub-processors in accordance with one or more aspects of the present invention.

With reference to the drawings, wherein like numerals indicate like elements, there is shown in FIG. 1 a multi-processing system 100 suitable for employing one or more aspects of the present invention. For the purposes of brevity and clarity, the block diagram of FIG. 1 will be referred to and described herein as illustrating an apparatus 100, it being understood, however, that the description may readily be applied to various aspects of a method with equal force. The apparatus 100 preferably includes a plurality of processors 102A-D, associated local memories 104A-D, and a main memory (or shared memory) 106 interconnected by way of a bus 108. Although four processors 102 are illustrated by way of example, any number may be utilized without departing from the spirit and scope of the present invention.

Each of the processors 102 may be of similar construction or of differing construction. The processors 102 may be implemented utilizing any of the known technologies that are capable of requesting data from the system memory 106, and manipulating the data to achieve a desirable result. For example, the processors 102 may be implemented using any of the known microprocessors that are capable of executing software and/or firmware, including standard microprocessors, distributed microprocessors, etc. By way of example, the processors 102 may be graphics processors that are capable of requesting and manipulating data, such as pixel data, including gray scale information, color information, texture data, polygonal information, video frame information, etc.

One or more of the processors 102 of the system 100 may take on the role as a main (or managing) processor. The main processor may schedule and orchestrate the processing of data by the other processors.

The system memory 106 is preferably a dynamic random access memory (DRAM) coupled to the processors 102 through a memory interface circuit (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 preferably includes a processor core and an associated one of the local memories 104 in which to execute programs. These components may be integrally disposed on a common semi-conductor substrate or may be separately disposed as may be desired by a designer. The processor core is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processor core may include an instruction buffer, instruction decode circuitry, dependency check circuitry, instruction issue circuitry, and execution stages.

Notably, the local memory 104 is preferably located in the same chip as the respective processor 102; however, the local memory 104 is preferably not a hardware cache memory in that there are preferably no on chip or off chip hardware cache circuits, cache registers, cache memory controllers, etc. to implement a hardware cache memory function. In alternative embodiments, the local memory 104 may be a cache memory and/or an additional cache memory may be employed. As on chip space is often limited, the size of the local memory 104 may be much smaller than the system memory 106. The processors 102 preferably provides data access requests to copy data (which may include program data) from the system memory 106 over the bus 108 into the respective local memories 104 for program execution and data manipulation. The mechanism for facilitating data access may be implemented utilizing any of the known techniques, such as direct memory access (DMA) techniques.

It is preferred that the processor 102 and the local memory 104, are disposed on a common integrated circuit. Thus, these elements may be referred to herein as "the processor 102." In an alternative embodiments, the storage medium 110 may also be disposed on the common integrated circuit with one or more of the other elements.

Figure 2:
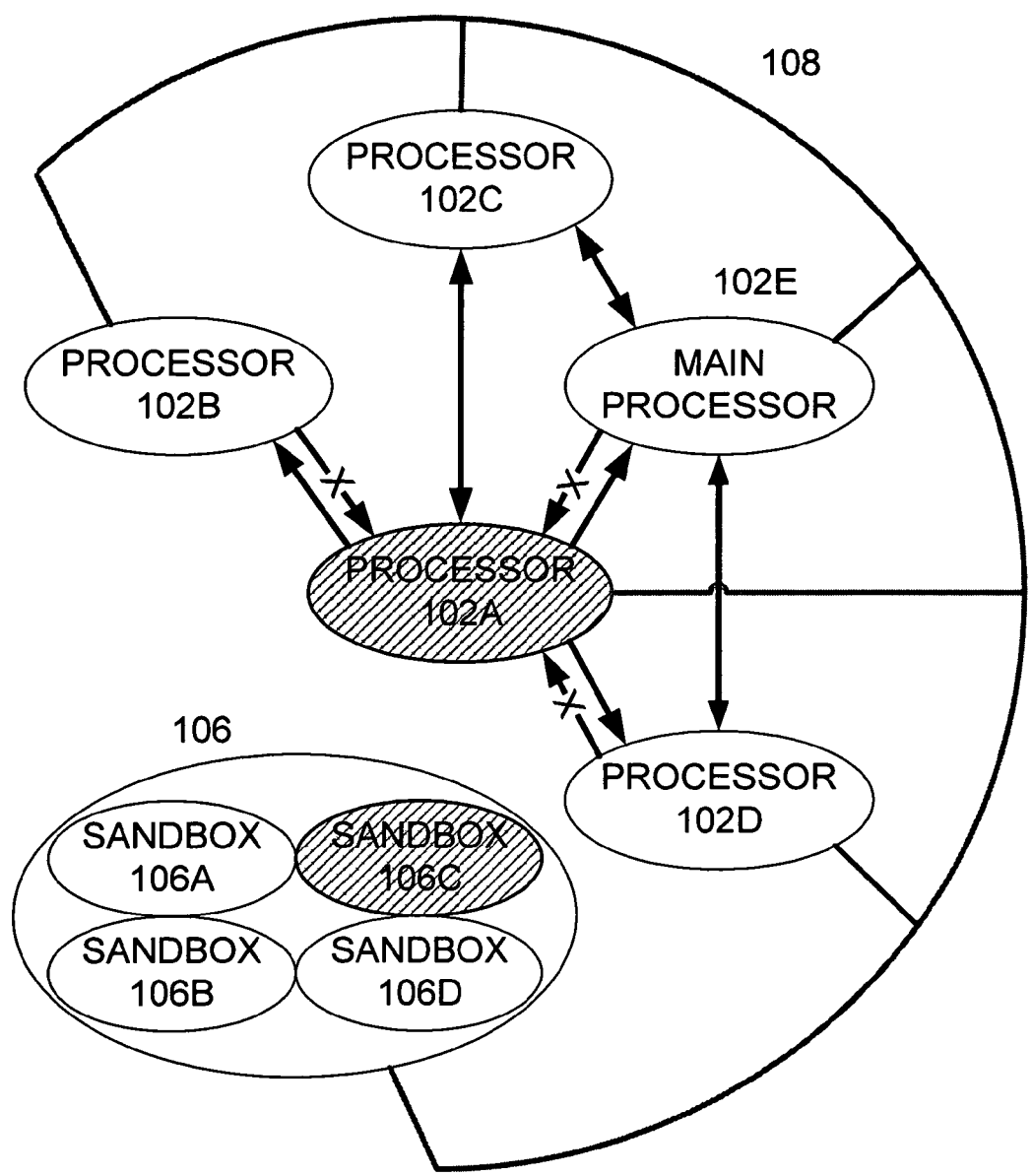
FIG. 2 is a partial block diagram, partial flow diagram and partial functional diagram illustrating relationships between the elements of the multi-processing system of FIG. 1 in accordance with one or more further aspects of the present invention.

Reference is now made to the apparatus 100 of FIG. 1 and to the functional and flow diagrams of FIGS. 2-3, which illustrate process steps that may be carried out by the apparatus 100 in accordance with one or more aspects of the present invention. At action 200, one or more of the processors 102 (such as processor 102A) are preferably operable to enter a secure mode of operation. In this secure mode of operation, no requests for data stored in the local memory 104 (or any other memory devices, registers, etc.) of the secure processor 102A will be serviced, thereby insuring a trusted environment in which to carry out sensitive operations. Despite being in a secure mode, the secure processor 102A may request the transfer of data from the system memory 106 into the local memory 104A, or may request the transfer of data from the local memory 104A to the system memory 106. Still further, the secure processor 102A may initiate the transfer of data into and out of the trusted environment irrespective of the source or destination while in the secure mode of operation.

In accordance with one or more alternative embodiments of the invention, the secure processor 102A my boot up in a secure fashion, whereby the boot code is first authenticated prior to permitting boot up. This ensures an even greater level of security when the secure processor 102A enters the secure mode of operation 200. Further details concerning the secure boot process may be found in co-pending U.S. Patent Application No.: 60/650,506, entitled METHODS AND APPARATUS FOR PROVIDING A SECURE BOOTING SEQUENCE IN A PROCESSOR, the entire disclosure of which is hereby incorporated by reference.

In connection with this example embodiment of the present invention, one of the processors 102 preferably takes on the role of a main processor, such as processor 102E. The main processor 102E, for example, may monitor the application programs and data being executed on the other processors 102 in order for the main processor 102E to invoke processing changes. These processing changes may include moving tasks from one processor 102 to another processor 102, to allocate data among the processors 102, etc. In this regard, the main processor 102E may seek to obtain data within any of the processors 102, such as the local memories 104 thereof, the hardware registers thereof, etc. As the secure processor 102A will not service requests for data from external entities, the main processor 102E cannot obtain data from the local memory 104A of the processor 102A (as illustrated by the broken arrow). Similarly, data access requests by the other processors, e.g., processor 102B and processor 102D are not serviced by the secure processor 102A.

The main processor 102E is also preferably operable to control access by the other processors 102 to data within the main memory 106 and within the other processors 102 (to the extent that they are not in a secure mode). For example, the main memory may include a plurality of sandboxes 106A-D, where each processor 102A-D is associated with one of the sandboxes 106A-D. Each sandbox 106A-D preferably defines an area of the main memory 106 beyond which the particular processor 102, or set of processors 102, cannot read or write data. The main processor 102E is preferably operable to control which processor 102 may read and write data to which sandbox or sandboxes 106A-D. Those skilled in the art will appreciate that there are many variations on this theme. For example, a general starting point may be that each processor 102 is associated with a single sandbox within the main memory 106 and within which to read and write data, although any of the processors may at least read the data of all sandboxes. Other configurations may require that the respective processors 102 are restricted to reading and writing data only within a particular sandbox of the main memory 106.

At Action 202, the main processor 102E preferably excludes access to the data of a further processor, such as processor 102C. This may entail preventing any of the other processors (processor 102A inclusive or exclusive) from reading or writing data to the sandbox 106C, which is associated with the further processor 102C. Assuming that the secure processor 102A is privy to this information, then a special relationship may be established between the secure processor 102A and the further processor 102C. Namely, these processors may collaborate with one another and pass data therebetween without breaching security. For example, the secure processor 102A may transmit or otherwise provide sensitive data to the further processor 102C for storage in the sandbox 106C; however, none of the other processors 102B, 102D may access such data in the sandbox 106C vis-à-vis the control established by the main processor 102E. Alternatively, or in addition, at action 204 a secure session may be established between the secure processor 102A and the further processor 102C, such as by insuring that any data transmissions therebetween are encrypted.

At Action 206, the further processor 102C may be privy to data provided by the secure processor 102A that is indicative of the status of the secure processor 102A. This status information may be available to the main processor 102E by way of appropriate control and access to the sandbox 106C. Thus, the main processor 102E may evaluate the processing status of any number of the processors 102, including the secure processor 102A, in connection with performing managerial functions, such as moving tasks among the processors 102, allocating data among the processors 102, etc. It is noted that without the collaboration between the secure processor 102A and the further processor 102C, the status information concerning the secure processor 102A would not readily be obtainable since the secure processor 102A does not service data requests from external devices.

At Action 208, the data contained within the sandbox 106A, associated with the secure processor 102A, may be accessed by the further processor 102C in response to the control of the main processor 102E. Thus, the further processor 102C may obtain data associated with the secure processor 102A for manipulation and/or storage in its own sandbox 106C.

It is noted that the control exercised by the main processor 102E with respect to the data access to the sandboxes of the main memory 106 may be achieved by controlling the "memory space" of the apparatus 100. The memory space may be defined as encompassing only the main memory 106, or it may be more broadly defined to include the local memories 104 and the hardware registers, etc. of the respective processors 102. Thus, the data access control by the main processor 102E may be extended to a larger memory space including the local memories 104, hardware registers, etc. of each of the processors 102.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
 a plurality of processors capable of being operatively coupled to a main memory that includes a plurality of sandboxes, each processor including an associated local memory and being operable to request at least some data from the main memory for use in the local memory, each processor having at least one of the sandboxes associated therewith; and
 at least one main processor operable to control access by the processors to data within the main memory, within the processors, and to permit or deny access by the processors to data within the respective sandboxes, wherein:
 the plurality of processors are each operable to enter a plurality of programmable modes, including: (i) a normal mode of operation in which requests initiated by others of the processors for data transfers into or out of the given processor are serviced, subject to the access controlled by the main processing unit; and (ii) a secure mode of operation in which no requests initiated by others of the processors for data transfers into or out of the given processor that has entered the secure mode are serviced, but such transfers initiated by the given processor are serviced subject to the access controlled by the main processing unit,
 the main processing unit is operable to establish a special secure relationship between one processor that has entered the secure mode of operation and a further processor that has entered the normal mode of operation, in which the main processing unit excludes access to data in a sandbox of the main memory that is associated with the further processor by others of the processors, even when such other processors are in the secure mode of operation, but permits access to the data in the sandbox of the main memory that is associated with the further processor by the one processor that is in the secure mode, and
 the main processor is operable to monitor data within all processors except the one processor in the secure mode of operation.

2. The apparatus of claim 1, wherein the main processor is operable to permit or deny access by the processors to data within the respective local memories of the processors.

3. The apparatus of claim 1, wherein the one processor that has entered the secure mode of operation and the further processor are operable to enter into a secure session in which data transferred therebetween may be encrypted.

4. The apparatus of claim 1, wherein the one processor that has entered the secure mode of operation is operable to send data to the further processor that when accessed provides information that the main processor may use to manage the processing performance of the apparatus.

5. An apparatus, comprising:
 a plurality of processors capable of being operatively coupled to a main memory includes a plurality of sandboxes, each processor including an associated local memory, being operable to request at least some data from the main memory for use in the local memory, and being associated with one or more of the sandboxes, each processor having at least one of the sandboxes associated therewith; and
 at least one main processor operable to at least one of permit or deny access by the processors to data within the respective sandboxes, control access by the processors to data within the processors, and to permit or deny access by the processors to data within the respective sandboxes, wherein:

the plurality of processors are each operable to enter a plurality of programmable modes, including: (i) a normal mode of operation in which requests initiated by others of the processors for data transfers into or out of the given processor are serviced, subject to the access controlled by the main processing unit; and (ii) a secure mode of operation in which no requests initiated by others of the processors for data transfers into or out of the given processor that has entered the secure mode are serviced, but such transfers initiated by the given processor are serviced subject to the access controlled by the main processing unit, the main processing unit is operable to establish a special secure relationship between one processor that has entered the secure mode of operation and a further processor that has entered the normal mode of operation, in which the main processing unit excludes access to the at least one sandbox of the further processor by the other processors, even when such other processors are in the secure mode of operation, but permits access to data in the at least one sandbox of the main memory that is associated with the further processor by the one processor that is in the secure mode, and the main processor is operable to monitor data within all processors except the one processor in the secure mode of operation.

6. The apparatus of claim 5, wherein at least one of:

the main processor is further operable to permit or deny access by the processors to data within the respective local memories of the processors, and the main processor is further operable to deny access to the local memory of the further processor by the other processors except the one processor.

7. In a multi-processor system including a plurality of processors capable of being operatively coupled to a main memory that includes a plurality of sandboxes, each processor including an associated local memory, at least one main processor operable to control access by the processors to data within the main memory and within the processors, and each processor having at least one of the sandboxes associated therewith, a method comprising:

permitting each of the plurality of processors to enter a plurality of programmable modes, including: (i) a normal mode of operation in which requests initiated by others of the processors for data transfers into or out of the given processor are serviced, subject to the access controlled by the main processing unit; and (ii) a secure mode of operation in which no requests initiated by others of the processors for data transfers into or out of the given processor are serviced, but such transfers initiated by the given processor are serviced, subject to the access controlled by the main processing unit; and using the main processing unit to establish a special secure relationship between one processor that has entered the secure mode of operation and a further processor that has entered the normal mode of operation, in which the main processing unit excludes access to data in a sandbox of the main memory that is associated with the further processor by others of the processors, even when such other processors are in the secure mode of operation, but permits access to the data in the sandbox of the main memory that is associated with the further processor by the one processor that is in the secure mode, wherein the main processor monitors data within all processors except the one processor in the secure mode of operation.

8. The method of claim 7, further comprising using the main processor to permit or deny access by the processors to data within the respective local memories of the processors.

9. The method of claim 8, further comprising
denying access to the local memory of the further processor by the other processors except the one processor.

10. The method of claim 7, further comprising establishing a secure session between the one processor and the further processor in which data transferred therebetween may be encrypted.

11. The method of claim 7, further comprising sending data from the one processor to the further processor that when accessed provides information that the main processor may use to manage the processing performance of the apparatus.

12. In a multi-processor system including a plurality of processors capable of being operatively coupled to a shared memory that includes a plurality of sandboxes, and each processor including an associated local memory, and at least one main processor operable to control access by the processors to data within the shared memory and within the processors, and each processor having at least one of the sandboxes associated therewith, a method comprising:

permitting each of the plurality of processors to enter a plurality of programmable modes, including: (i) a normal mode of operation in which requests initiated by others of the processors for data transfers into or out of the given processor are serviced, subject to the access controlled by the main processing unit; and (ii) a secure mode of operation in which no requests initiated by others of the processors for data transfers into or out of the given processor are serviced, but such transfers initiated by the given processor are serviced;

establishing a special secure relationship between one processor that has entered the secure mode of operation and a further processor that has entered the normal mode of operation, by excluding access to data within a sandbox of the shared memory that is associated with the one further processor by others of the processors, even when such other processors are in the secure mode of operation, but permitting access to the data in the sandbox of the main memory that is associated with the further processor by the at least one processor that is in the secure mode; and permitting access to data within the shared memory associated with the one processor by the further processor, wherein the main processor monitors data within all processors except the one processor in the secure mode of operation.

13. A computer-readable, non-transitory storage medium containing a computer-executable program capable of causing a processor of the computer to carry out actions, the processor being part of a multi-processor system including a plurality of processors capable of being operatively coupled to a main memory that includes a plurality of sandboxes, each processor including an associated local memory, at least one main processor operable to control access by the processors to data within the main memory and within the processors, and each processor having at least one of the sandboxes associated therewith, a method comprising:

permitting each of the plurality of processors to enter a plurality of programmable modes, including: (i) a normal mode of operation in which requests initiated by others of the processors for data transfers into or out of the given processor are serviced, subject to the access controlled by the main processing unit; and (ii) a secure mode of operation in which no requests initiated by others of the processors for data transfers into or out of the given processor are serviced, but such transfers initiated by the given processor are serviced, subject to the access controlled by the main processing unit; and using the main processing unit to establish a special secure relationship between one processor that has entered the secure mode of operation and a further processor that has entered the normal mode of operation, in which the main processing unit excludes access to data in a sandbox of the main memory that is associated with the further processor by others of the processors, even when such other processors are in the secure mode of operation, but permits access to the data in the sandbox of the main memory that is associated with the further processor by the one processor that is in the secure mode, wherein the main processor monitors data within all processors except the one processor in the secure mode of operation.

14. A computer-readable, non-transitory storage medium containing a computer-executable program capable of causing a processor of the computer to carry out actions, the processor being part of a multi-processor system including a plurality of processors capable of being operatively coupled to a shared memory that includes a plurality of sandboxes, and each processor including an associated local memory, and at least one main processor operable to control access by the processors to data within the shared memory and within the processors, and each processor having at least one of the sandboxes associated therewith, a method comprising:

permitting each of the plurality of processors to enter a plurality of programmable modes, including: (i) a normal mode of operation in which requests initiated by others of the processors for data transfers into or out of the given processor are serviced, subject to the access controlled by the main processing unit; and (ii) a secure mode of operation in which no requests initiated by others of the processors for data transfers into or out of the given processor are serviced, but such transfers initiated by the given processor are serviced;

establishing a special secure relationship between one processor that has entered the secure mode of operation and a further processor that has entered the normal mode of operation, by excluding access to data within a sandbox of the shared memory that is associated with the one further processor by others of the processors, even when such other processors are in the secure mode of operation, but permitting access to the data in the sandbox of the main memory that is associated with the further processor by the at least one processor that is in the secure mode; and permitting access to data within the shared memory associated with the one processor by the further processor, wherein the main processor monitors data within all processors except the one processor in the secure mode of operation.

* * * * *